United States Patent
Mano et al.

(10) Patent No.: US 7,156,765 B2
(45) Date of Patent: Jan. 2, 2007

(54) LUBRICATING MECHANISM OF OIL PUMP

(75) Inventors: Yasunori Mano, Anjo (JP); Kenji Omote, Anjo (JP); Kazutoshi Motoike, Toyota (JP); Masatoshi Adachi, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 79 days.

(21) Appl. No.: 10/944,798

(22) Filed: Sep. 21, 2004

(65) Prior Publication Data

US 2005/0064976 A1    Mar. 24, 2005

(30) Foreign Application Priority Data

Sep. 22, 2003    (JP)    ............................. 2003-330748

(51) Int. Cl.
    *F16H 3/72*    (2006.01)
(52) U.S. Cl. ........................................................ 475/5
(58) Field of Classification Search ............... 475/159, 475/5, 136, 72, 83; 74/606 R; 184/6.12, 184/6.28, 27.1; 417/374, 423.6; 418/166, 418/171, 94, 98, 99, 206.1, 206.8
    See application file for complete search history.

(56) References Cited

U.S. PATENT DOCUMENTS

| | | | |
|---|---|---|---|
| 2,574,431 A * | 11/1951 | Banker | ........................ 475/130 |
| 3,623,568 A | 11/1971 | Mori et al. | |
| 4,489,626 A * | 12/1984 | Lemon | ........................ 475/159 |
| 4,973,232 A * | 11/1990 | Etou et al. | ................. 418/55.6 |
| 5,230,664 A * | 7/1993 | Michioka et al. | ............. 474/43 |
| 5,419,406 A * | 5/1995 | Kawamoto et al. | ........ 180/65.6 |
| 5,904,631 A * | 5/1999 | Morisawa et al. | ............. 475/5 |
| 6,471,495 B1 * | 10/2002 | Allen et al. | ............... 417/423.6 |
| 2001/0051556 A1* | 12/2001 | Takenaka | ........................ 475/5 |
| 2003/0064854 A1 | 4/2003 | Kotani | |
| 2004/0084233 A1 | 5/2004 | Wakuta et al. | |

FOREIGN PATENT DOCUMENTS

| | | |
|---|---|---|
| JP | 47-31773 | 8/1972 |
| JP | A-2002-054722 | 2/2002 |
| JP | A-2002-225578 | 8/2002 |
| JP | 2003130189 A * | 5/2003 |
| JP | A-2003-130189 | 5/2003 |

* cited by examiner

*Primary Examiner*—Roger Pang
*Assistant Examiner*—Justin K. Holmes
(74) *Attorney, Agent, or Firm*—Oliff & Berridge, PLC

(57) ABSTRACT

A rotation of an input shaft is accelerated and transmitted to a drive shaft of an oil pump through gears. The oil pump is provided with a lubricant hole and part of the lubricant discharged from a discharge side oil chamber is supplied to a first sliding face of a radial bearing through the lubricant hole. By provision of a cutout portion in an oil sump and a first rib, part of the lubricant supplied from the input shaft to a bearing through a plurality of oil passages and the oil sump is supplied to a second sliding face which rotatably supports a thrust washer.

18 Claims, 5 Drawing Sheets

LUBRICATING MECHANISM OF OIL PUMP

CROSS-REFERENCE TO RELATED APPLICATION

This application claims priority from JP 2003-330748, filed Sep. 22, 2003, the disclosure of which in its entirety is incorporated herein by reference thereto.

BACKGROUND OF THE INVENTION

1. Field of Invention

The invention relates to a lubricating mechanism of oil pump that is used in a state in which rotation thereof is accelerated with respect to an input shaft, for example, in a transmission mounted on an automobile and the like.

2. Description of Related Art

An oil pump incorporated in a transmission of an automobile and the like is driven by the rotation of the input shaft so as to generate a necessary oil pressure and oil quantity. In such an oil pump, each sliding portion needs to be lubricated sufficiently to secure its function and durability.

As is disclosed in Japanese Patent Laid-Open No. 2003-130189, for instance, there is a case in which the size of the oil pump is reduced for weight reduction of the transmission or space saving. In this case, to secure the necessary oil pressure and sufficient oil quantity, a drive shaft of the oil pump is rotated at a higher speed compared to a regular case. Therefore, a sliding face of a bearing member that supports an outer face and end face of the drive shaft must be provided with a sufficient amount of lubricant. In addition, a structure as disclosed in, for example, Japanese Patent Laid-Open No. 2002-54722 is known as a structure for securing a sufficient oil quantity.

SUMMARY OF THE INVENTION

However, to supply a sufficient amount of lubricant to the lubricating face of the bearing member, a special lubricant passage or guide for introducing lubricant to the sliding face needs to be provided. As a result, there has been a problem that the structure becomes complicated and the processing time increases.

It is the object of the invention to provide a lubricating mechanism, of an oil pump capable of supplying a sufficient amount of lubricant to the sliding faces yet having a A lubricating mechanism of an oil pump, comprising a drive shaft disposed in parallel to an input shaft; a bearing having a sliding face for rotatably supporting an outer face of the drive shaft; and a rotor which is driven by the drive shaft so as to pressurize lubricant in a suction side oil chamber and feeds the lubricant to a discharge side oil chamber, a rotation of the input shaft being accelerated and transmitted to the drive shaft, wherein a lubricant hole is provided for communicating the discharge side oil chamber to the sliding face.

According to the invention, pressurized lubricant in a discharge side oil chamber can be supplied to the first sliding face through a lubricant hole. Such a lubricant passage can be provided relatively easily by, for example, drilling.

A lubricating mechanism of an oil pump, comprising a drive shaft disposed in parallel to an input shaft; a bearing for rotatably supporting the drive shaft; a rotor which is fixed on one end face in an axial direction of the drive shaft for pressurizing lubricant in a suction side oil chamber and feeding the lubricant to a discharge side oil chamber; and a thrust bearing having a sliding face for rotatably supporting the other end face in the axial direction of the drive shaft, a rotation of the input shaft being accelerated and transmitted to the drive shaft, wherein a bearing holding portion is provided for supporting a bearing, from outside thereof, disposed inward of the sliding face along a radial direction of the input shaft; an oil sump is provided in the bearing holding portion so as to protrude in the axial direction from an end portion of the bearing so that lubricant supplied from the input shaft side is introduced to the bearing; and a cutout portion is provided in the oil sump such that part of the lubricant supplied from the oil sump to the bearing is supplied to the sliding face through the cutout portion.

Further, with the simple structure of providing part of an oil sump, in a bearing holding portion, with a cutout portion, part of lubricant supplied to the bearing can be supplied to a second sliding face through the cutout portion.

BRIEF DESCRIPTION OF THE DRAWINGS

The invention will be described with reference to the drawings, in which.

DETAILED DESCRIPTION OF PREFERRED EMBODIMENT

Figure 1:
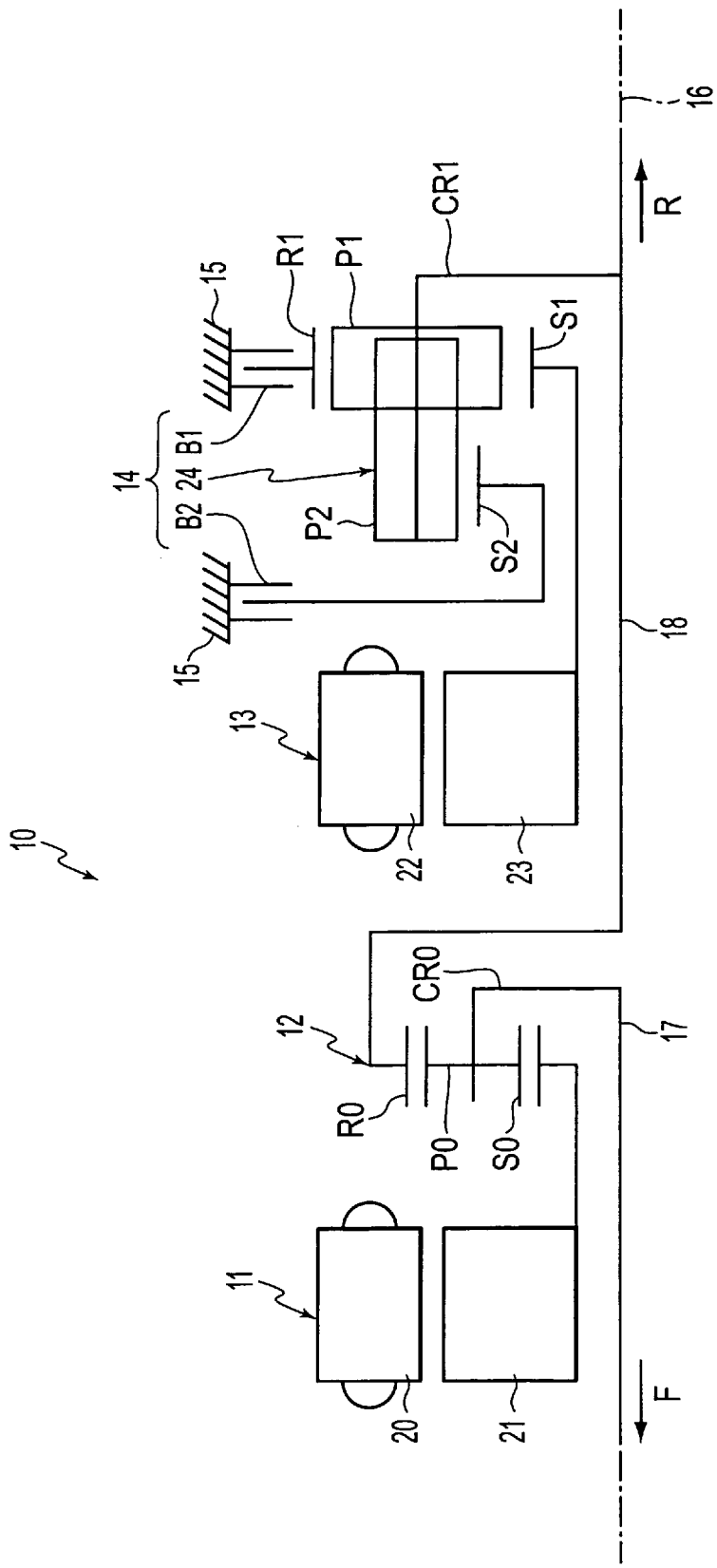
FIG. 1 is a schematic diagram showing a structure of a hybrid drive unit to which the lubricating mechanism of oil pump is applied.

Hereinafter, an exemplary embodiment of the invention will be described. The same reference numerals are used in the accompanying drawings to indicate components having the same structure or operation, and a duplicate description thereof is omitted as appropriate.

A lubricating mechanism of oil pump of the invention can be applied to a hybrid driving unit mounted on, for example, an automobile. A schematic structure of an entire hybrid driving unit 10 will be described briefly with reference to the schematic diagram shown in FIG. 1. The direction of arrow F in FIG. 1 indicates the front side (engine side) of an automobile while the direction of an arrow R indicates the rear side (differential gear side) of the automobile.

As shown in FIG. 1, in the hybrid driving unit 10, a first electric motor 11, a power distributing planetary gear 12, a second electric motor 13 and a transmission 14 are disposed in that order from the front side to the rear side. These components are accommodated inside a case 15 such that they are disposed around an axis 16 (axis of each of an input shaft 17 and an output shaft 18). The case 15 is structured integrally by joining a plurality of division cases in the back and forth direction along the axis (direction along an axis 16). In a description below, if it is simply referred to as the "axial direction", it means a direction along the axis 16. This axial direction coincides with the axial directions of the input shaft 17, the output shaft 18 and a drive shaft 31 which will be described later.

The first electric motor 11 comprises a stator 20 fixed on the case 15 and a rotor 21 supported rotatably on the side of an inside diameter side (inner circumference) of the stator 20 (in the following description, as for the positions in the radial direction of the case 15, the side closer to the axis 16 is designated as the inside diameter side and the side away from the axis 16 is designated as the outside diameter side). In the first electric motor 11, the rotor 21 thereof is connected to a sun gear S0 of the drive power distributing planetary gear 12 which will be described below. The first electric motor 11 generates electric power based on mainly drive power input through the sun gear S0, so as to drive the second electric motor 13 through an inverter (not shown) or charge an HV battery (hybrid drive battery (not shown)).

The drive power distributing planetary gear 12 is structured of a single pinion planetary gear disposed coaxially with respect to the input shaft 17. The drive power distributing planetary gear 12 comprises a carrier CR0 for supporting a plurality of pinions P0, a sun gear S0 which engages the pinion P0 and a ring gear R0 which engages the pinion P0. In the drive power distributing planetary gear 12, the carrier CR0 is connected to the input shaft 17, the sun gear S0 is connected to the rotor 21 of the first electric motor 11, and the ring gear R0 is connected to the output shaft 18. The drive power distributing planetary gear 12 distributes drive power input to the carrier CR through the input shaft 17 to the first electric motor 11 side through the sun gear S0 and to the output shaft 18 side through the ring gear R0, based on rotation control of the first electric motor 11. In the meantime, drive power distributed to the first electric motor 11 is supplied for power generation and, on the other hand, the drive power distributed to the output shaft 18 is supplied for driving an automobile.

The second electric motor 13 comprises a stator 22 fixed on the case 15 and a rotor 23 supported rotatably on the inner diameter side of the stator 22. The second electric motor 13 is coupled with a sun gear S1 of the transmission 14, which will be described later. Like the aforementioned first electric motor 11, the second electric motor 13 is connected to the HV battery through the inverter. However, its main function is different. That is, unlike the first electric motor 11 which is used mainly for generating electric power, the second electric motor 13 mainly functions as a drive motor for assisting the drive power of the automobile. However, in a case where, for instance, the brake is applied, it functions as a generator to regenerate a vehicle inertial force in the form of electric energy.

The transmission 14 has a so-called Ravigneaux type planetary gear unit 24 composed of one double pinion planetary gear and a single pinion planetary gear commonly using that one pinion, and further comprises a first brake B1 and a second brake B2.

The planetary gear unit 24 comprises two sun gears S1, S2, a carrier CR1 for supporting a pinion P1 and a pinion P2 which is a common long pinion, and a ring gear R1. Of the two pinions P1, P2, the pinion P1 engages the sun gear S1 and the ring gear R1 while the pinion P2 engages the sun gear S2 and the pinion P1. In the planetary gear unit 24, the ring gear R1 is coupled with the first brake B1, and the sun gear S2 is coupled with the second brake B2. In the overall transmission 14, the sun gear S 1, as an input member, is coupled with the rotor 23 of the second electric motor 13 and the carrier CR1, as an output member, is coupled with the output shaft 18. The transmission 14 engages one of the first and second brakes B1, B2 while releasing the other, or releases one of them while engaging the other as will be described later so as to switch to two reduction gears, each of which has a different reduction gear ratio. That is, the transmission 14 charges the magnitude of drive power input from the second electric motor 13 through the sun gear S1, and the drive power is transmitted to the output shaft 18 through the carrier CR1 and the ring gear R0.

In the hybrid driving unit 10 structured as above, a drive power input to the input shaft 17 from an engine is distributed to the first electric motor 11 and the output shaft 18 by the drive power distributing planetary gear 12. Then, a drive power is transmitted from the second electric motor 13 to the output shaft 18 through the transmission 14. That is, the drive power from an engine and the drive power from the second electric motor 13 are synthesized and output to the output shaft 18.

The oil pump to which the lubricating mechanism of the oil pump of this embodiment is applied is disposed under the outer periphery of the drive power distributing planetary gear 12, that is, just below the outer side of the ring gear R0.

Figure 2:
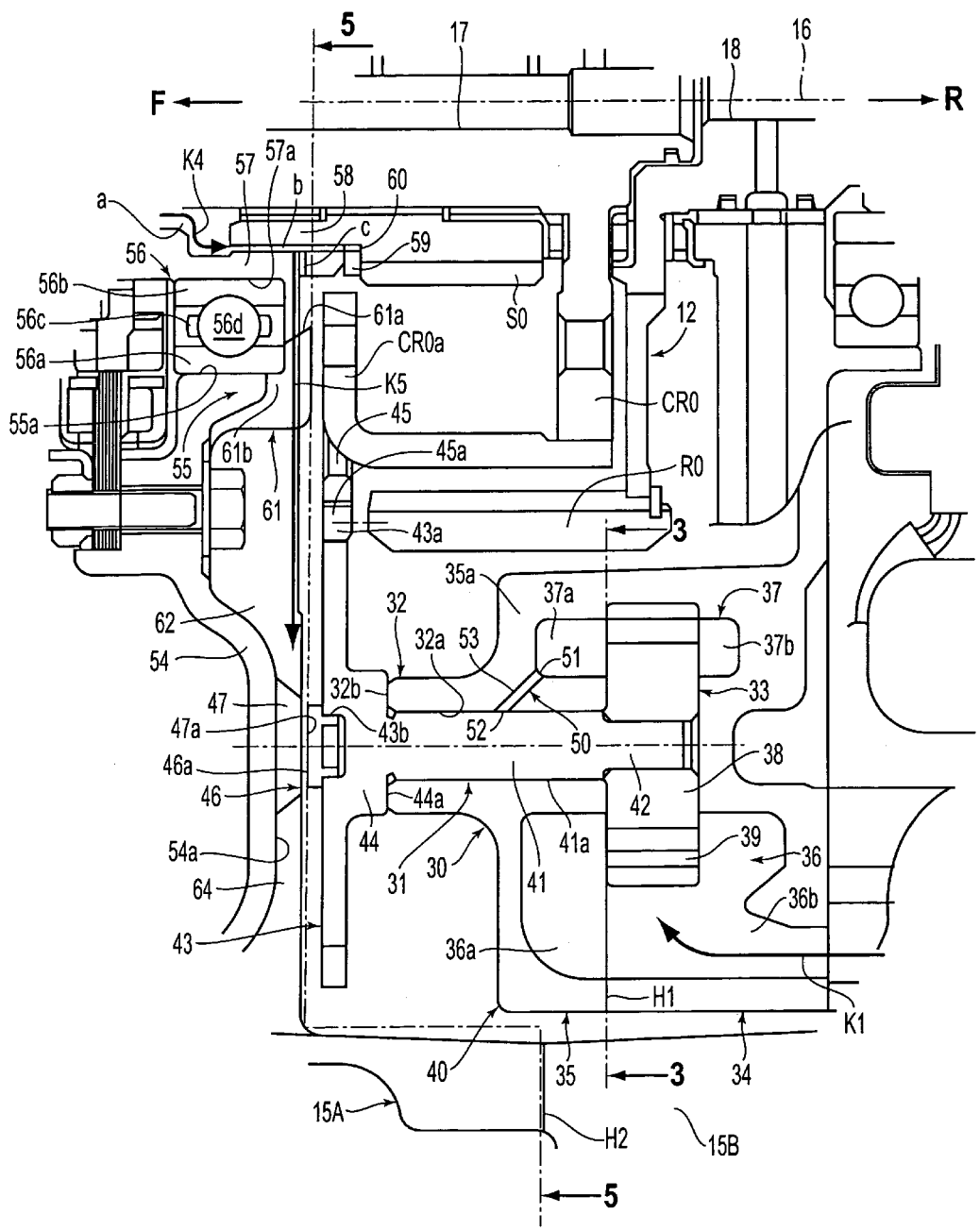
FIG. 2 is a longitudinal sectional view of the vicinity of the oil pump.
Figure 3:
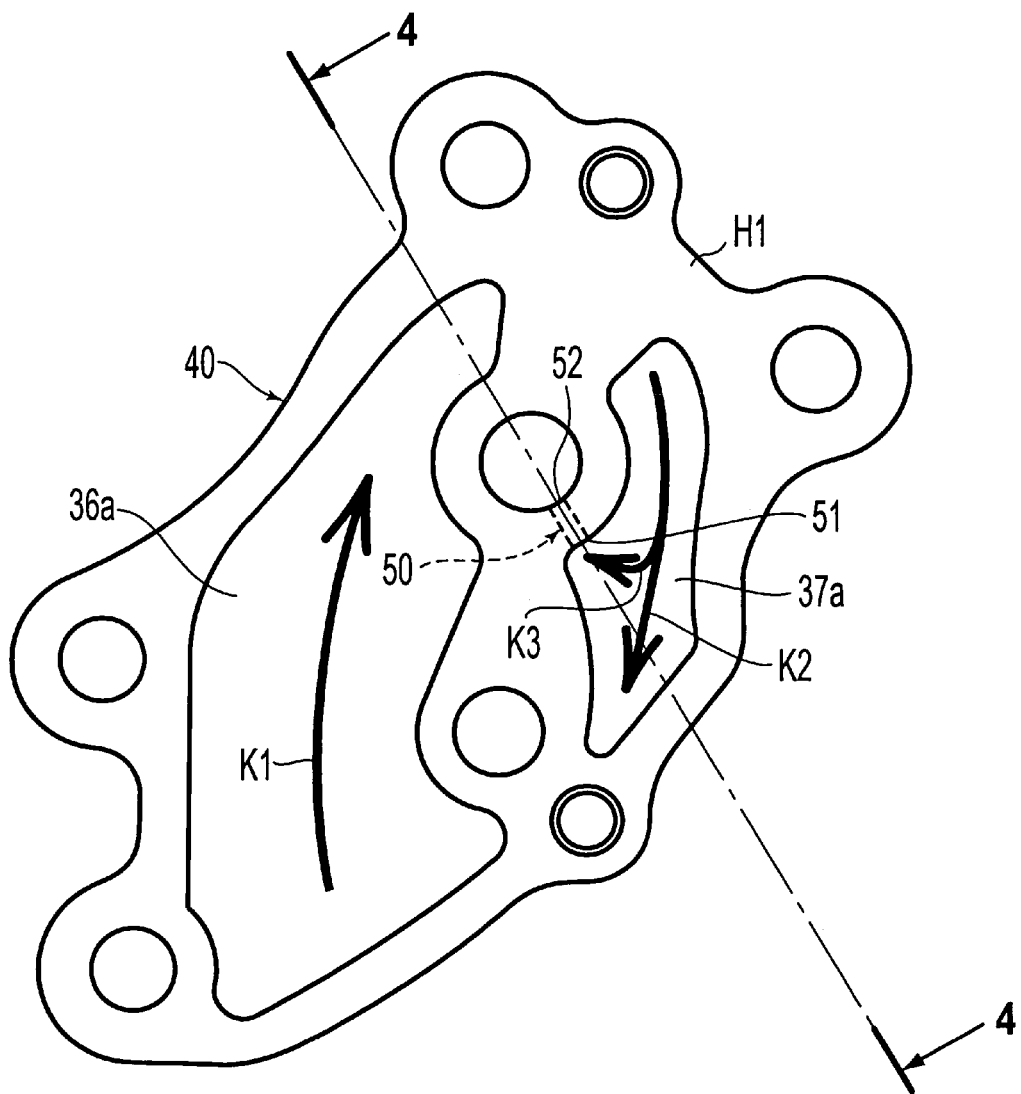
FIG. 3 is a sectional view taken along the line 3—3 in FIG. 2.
Figure 4:
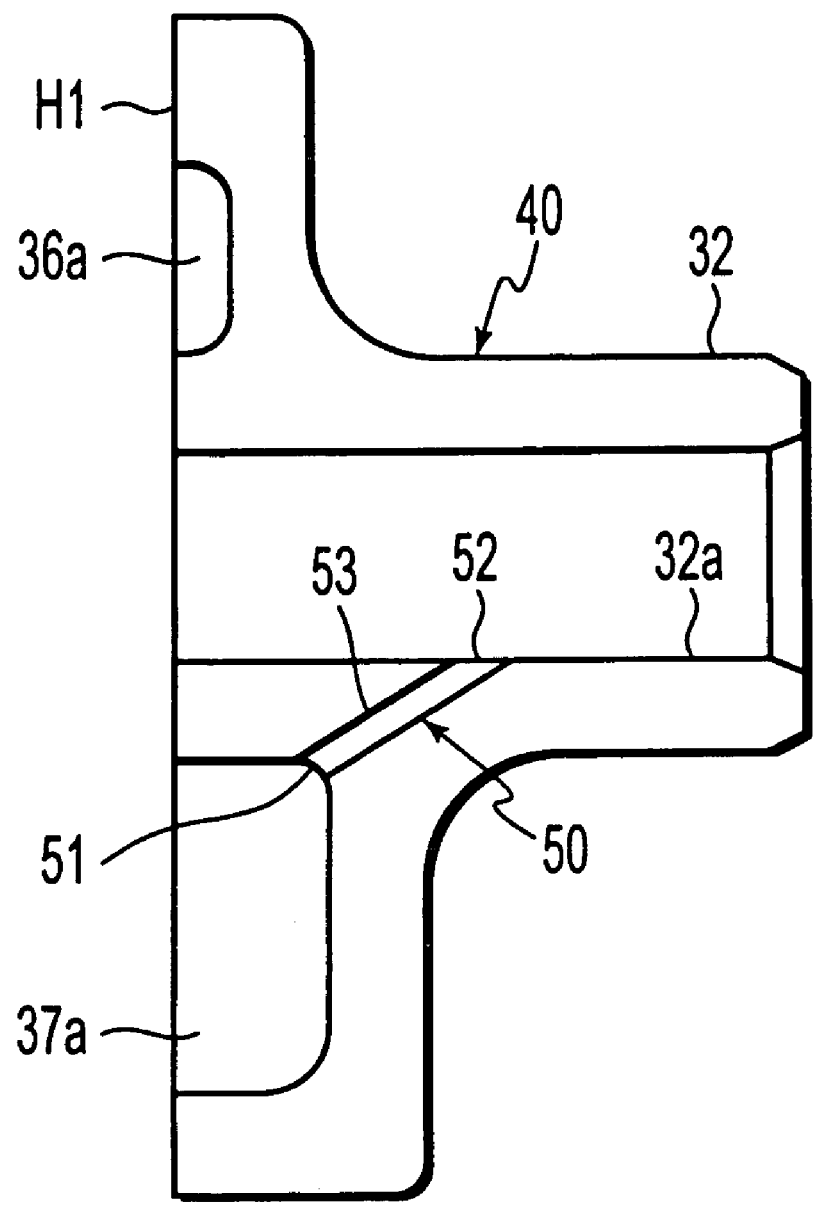
FIG. 4 is a sectional view taken along the line 4—4 in FIG. 3.

The lubricating mechanism of the oil pump according to this embodiment will be described with reference to FIGS. 2, 3, and 4. FIG. 2 shows a longitudinal sectional view of the vicinity of an oil pump 30. Of respective components shown in FIG. 2, the drive power distributing planetary gear 12, the axis 16, the input shaft 17, the output shaft 18, the sun gear S0, the carrier CR0 and the ring gear R0 correspond to those described in the schematic diagram of FIG. 1. FIG. 3 is a sectional view taken along the line 3—3 in FIG. 2, that is, a rear view of the case member, which will be described later, viewed from the back (right side in FIG. 2). FIG. 4 is a sectional view taken along the line 4—4 in FIG. 3.

As the oil pump 30, for example, an internal gear pump is used. The oil pump 30, as shown in FIG. 2, comprises a drive shaft 31 disposed in parallel to the input shaft 17, a radial bearing 32 for rotatably supporting the drive shaft 31, and a rotor 33 which is driven by the drive shaft 31. Further, by bonding a pump body 34 on the rear side and a pump cover 35 on the front side at a bonding face H1 in the axial direction, a suction side oil chamber 36 and a discharge side oil chamber 37 are created.

The aforementioned rotor 33 comprises a small gear 38 that is fixed to a mounting portion, which will be described later, at the rear end portion of the drive shaft 31 and has a tooth portion on an outer face thereof, and an internal gear 39 which engages with the small gear 38 and rotates eccentrically along with rotation of the small gear 38. Lubricant flowing into the suction side oil chamber 36 from an oil pan (not shown) in the direction of an arrow K1 is pressurized by the rotation of the rotor 33 and fed to the discharge side oil chamber 37. Further, according to this embodiment, the pump cover 35 is integrated with the aforementioned radial bearing 32, constituting the case member 40.

The oil pump 30 will be described in detail. The drive shaft 31, which is one of the component elements of the oil pump 30, comprises a shaft portion 41 parallel to the input shaft 17, a flat portion 42 formed at the rear end portion (one end face) of the shaft portion 41 and a gear 43 formed on the front end portion (the other end face) of the shaft portion 41, these components being integrated.

Of these, the shaft portion 41 is formed relatively long in the axial direction and its outer face 41a is supported rotatably by a first sliding face (inner peripheral face) 32a of the radial bearing 32 throughout the entire length in the axial direction.

The flat portion 42 is formed in the form of a plate extending to the rear from the shaft portion 41 and has two flat planes. The small gear 38 is fixed (engaged) to these two flat planes such that it is not movable in the axial direction and the circumferential direction. Instead of the flat portion 42, a small diameter portion may be formed such that the small gear 38 is fixed to the small diameter portion through a key.

The gear 43 is formed entirely substantially in the form of a flange and a step portion 44 is provided in the center of the rear face side. The entire drive shaft 31 is kept from moving backward along the axial direction and positioned by a rear end face 44a of the step portion 44 coming into contact with the front end face 32b of the radial bearing 32. A tooth portion 43a is formed on the outer face of the gear 43. The tooth portion 43a engages with a tooth portion 45a of the gear 45 formed on a front carrier plate CR0a of the carrier CR0 integrated with the aforementioned input shaft 17. According to the embodiment, with respect to the diameter of the gear 45 which rotates together with the input shaft 17, the diameter of the gear 43 of the drive shaft 31 on the side of the oil pump 30 is set to substantially half. Therefore, the rotation of the input shaft 17 is accelerated substantially double and transmitted to the drive shaft 31 through the carrier CR0 and the gear 45. That is, with a simple structure of using a gear 45, the rotation of the input shaft 17 can be accelerated and transmitted to the drive shaft 31.

A dent portion 43b is formed in the center of the front face of the gear 43 of the drive shaft 31. A thrust washer 46 engages with the dent portion 43b. The thrust washer 46 is formed with a front end face 46a smoothly. The front end face 46a is brought into a sliding contact with a second sliding face 47a of a thrust bearing 47 which will be described later. The entire drive shaft 31 is kept from moving forward in the axial direction and positioned by the front end face 46a of the thrust washer 46 coming into contact with the second sliding face 47a. Further, because the thrust washer 46 is rubbed by the second sliding face 47a of the thrust bearing 47, a degree of freedom in the selection of material for the drive shaft 31 and thrust washer 46 is increased.

The drive shaft 31 is supported rotatably by the radial bearing 32 as described above. The radial bearing 32 is formed substantially cylindrically and has, on its inner face, the first sliding face 32a for directly supporting the outer face 41a of the shaft portion 41 of the drive shaft 31. The axial length of the first sliding face 32a (bearing width) is set to substantially the same axial length of the outer face 41a of the shaft portion 41. That is, the first sliding face 32a supports the outer face 41a of the shaft portion 41 throughout the entire length in the axial direction. In the pump cover 35 of the case member 40, a front portion 36a of the suction side oil chamber 36 and a front portion 37a of the discharge side oil chamber 37 are formed toward the front side. A rear portion 36b of the suction side oil chamber 36 and a rear portion 37b of the discharge side oil chamber 37 are formed toward the rear side of the pump body 34. Furthermore, by bonding the case member 40 to the pump body 34 via the bonding face H1, the front portion 36a is integrated with the rear portion 36b to constitute the suction side oil chamber 36, and, in addition, the front portion 37a is integrated with the rear portion 37b to constitute the discharge side oil chamber 37.

The aforementioned rotor 33 is disposed on the side of the pump body 34 such that the front end face substantially meets the bonding face H1. The rotation of the input shaft 17 is accelerated substantially double and transmitted to the rotor 33 through the drive shaft 31. Therefore, even when the oil pump 30 of a relatively small size is used, a sufficient amount of lubricant can be discharged from the discharge side oil chamber 37 due to accelerated rotation of the drive shaft 31 as described above. That is, the oil pump 30 secures a necessary amount of lubricant by accelerating the rotation of the drive shaft 31 to compensate for the size reduction.

If the drive shaft 31 is accelerated as described above, the amount of lubricant supplied between the first sliding face 32a of the radial bearing 32 and the outer face 41a of the shaft portion 41 of the drive shaft 31 needs to be increased, in comparison with a case in which the drive shaft 31 is not accelerated.

Therefore, in this embodiment, a lubricant hole 50 is provided between the discharge side oil chamber 37 and the first sliding face 32a of the radial bearing 32, so that part of lubricant discharged from the discharge side oil chamber 37 is supplied to the first sliding face 32a through the lubricant hole 50.

The lubricant hole 50 has an intake side opening 51 which is open to the discharge side oil chamber 37 and an outlet side opening 52 which is open to the first sliding face 32a. A portion between the intake side opening 51 and the outlet side opening 52 of the lubricant hole 50, that is, an intermediate portion 53 is provided such that it runs through linearly in the radial bearing 32 of the case member 40 obliquely from outside to inside. The discharge side oil chamber 37 is communicated to the first sliding face 32a through the lubricant hole 50. The intake side opening 51 of the lubricant hole 50 is disposed on the front end portion and the inner peripheral side (side closer to the first sliding face 32a) of the discharge side oil chamber 37. Because the intake side opening 51 is open to an end portion of the discharge side oil chamber 37, lubricant within the discharge side oil chamber 37 is likely to flow into the lubricant hole 50 through the intake side opening 51. On the other hand, the outlet side opening 52 is disposed substantially in the center along the axial direction of the first sliding face 32a, that is, substantially in the middle of the bearing width. Because the intake side opening 51 of the lubricant hole 50 is disposed substantially in the center of the first sliding face 32a along the axial direction of the drive shaft 31, lubricant can be supplied equally from the outlet side opening 52 to both an end portion of the first sliding face 32a and the other end portion. That is, lubricant can be supplied uniformly from the outlet side opening, that is open to substantially the center of the first sliding face 32a, to the entire first sliding face 32a. Such a lubricant hole 50 can be provided by drilling the case member 40 from the side of the intake side opening 51 using a drill. In this case, because the intake side opening 51 is disposed at an end portion of the discharge side oil chamber 37, spot-facing before drilling is not necessary, thereby facilitating the processing accordingly.

According to the embodiment, as shown in FIG. 2, the lubricant hole 50 is made in the vicinity of a position where the radial bearing 32 of the case member 40 intersects a wall portion 35a on the front side of the pump cover 35. Consequently, reduction in strength of the case member 40 due to provision of the lubricant hole 50 can be minimized.

In the oil pump 30 structured as above, when the input shaft 17 is rotated, the rotation thereof is accelerated substantially double through the front carrier plate CR0a of the carrier CR0, the gear 45 and the gear 43. When the drive shaft 31 is rotated, the small gear 38 integrated therewith is rotated and, further, the internal gear 39 which engages with the small gear 38 is rotated. Consequently, lubricant flowing into the suction side oil chamber 36 in the direction of an arrow K1 (see FIGS. 2 and 3) is pressurized and flows in the direction of an arrow K2 (see FIG. 3) within the discharge side oil chamber 37. Part thereof is branched in the direction of an arrow K3, flows in from the intake side opening 51, passes the lubricant hole 50, and is supplied to the first sliding face 32a through the outlet side opening 52.

According to the lubricating mechanism of oil pump of this embodiment, by providing the lubricant hole 50 between the discharge side oil chamber 37 and the first sliding face 32a of the radial bearing 32, part of lubricant discharged from the discharge side oil chamber 37 can be supplied to the first sliding face 32a through the lubricant hole 50. In this case, as the rotation of the drive shaft 31 is accelerated, it is necessary to increase the quantity of lubricant. According to this embodiment, as the rotation of the drive shaft 31 is accelerated, the quantity of lubricant discharged from the discharge side oil chamber 37 is increased, and, accordingly, the quantity of lubricant supplied to the first sliding face 32a through the lubricant hole 50 is increased. As described above, according to this embodiment, with a simple structure of providing the lubricant hole 50 between the discharge side oil chamber 37 and the first sliding face 32a, a sufficient amount of lubricant can be supplied to the first sliding face 32a.

Because the intake side opening 51 of the lubricant hole 50 is open to an end portion of the discharge side oil chamber 37, lubricant in the discharge side oil chamber 37 is likely to be supplied to the lubricant hole 50 through the intake side opening 51.

Further, because the outlet side opening 52 of the lubricant hole 50 is disposed substantially in the center along the axial direction of the first sliding face 32a, the lubricant can be supplied from the outlet side opening 52 equally to one end side (front end side) of the first sliding face 32a and the other end side (rear end side). That is, lubricant can be supplied uniformly to the entire first sliding face 32a from the outlet side opening 52 disposed in the center. Of the lubricant which lubricates the first sliding face 32a, lubricant flowing forward along the first sliding face 32a can lubricate between the front end face 32b of the radial bearing 32 and the rear end face 44a of the step portion 44 in the gear 43 of the drive shaft 31. The diameter of the aforementioned lubricant hole 50 may be set to a minimum size capable of supplying a necessary amount of lubricant.

In the above embodiment, the outer face 41a of the shaft portion 41 of the drive shaft 31 has been explained by taking an example that the first sliding face 32a of the radial bearing 32 is supported directly. According to the invention, instead of this mechanism, a bearing (not shown) or a bush (not shown) may be inserted between the other face 41a of the bearing 41 and the first sliding face 32a of the radial bearing 32 so as to support the drive shaft 31 rotatably. According to the invention, in this case also, a sufficient amount of lubricant can be supplied to the bearing or bush through the aforementioned lubricant hole.

Figure 5:
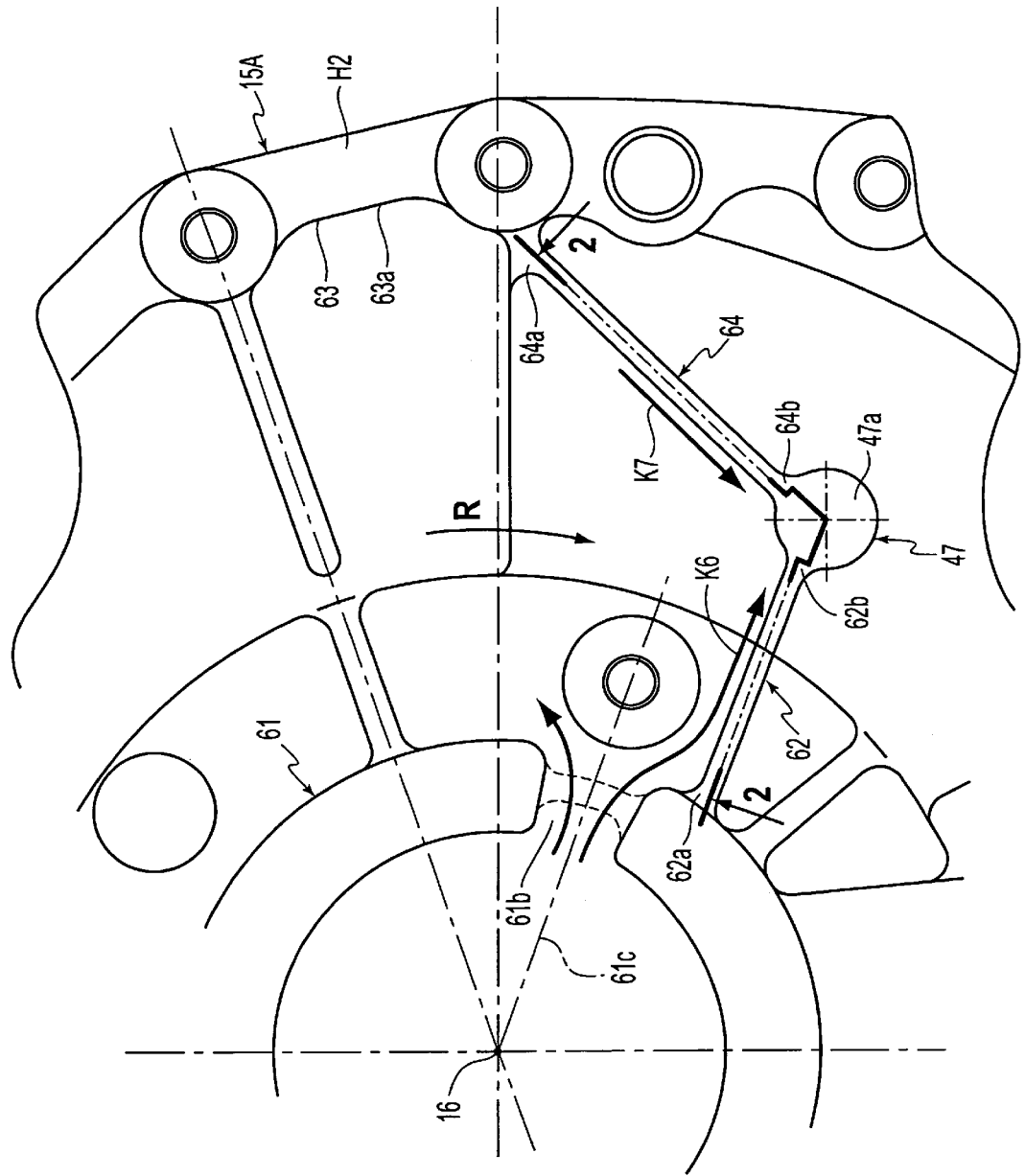
FIG. 5 is a sectional view taken along the line 5—5 in FIG. 2.

Another feature of the lubricating mechanism of oil pump according to the embodiment will be explained with reference to FIGS. 2 and 5. FIG. 2 shows a longitudinal sectional view of the vicinity of the oil pump 30. FIG. 5 is a sectional view taken along the line 5—5 in FIG. 2, that is, a view of a division case (transmission housing) 15A viewed from the back. In FIG. 5, members other than the division case 15A are omitted. The division case 15A in FIG. 2 corresponds to a sectional view taken along the line 2—2 on the division case 15A in FIG. 5.

The lubricating mechanism of the oil pump according to this embodiment is a lubricating mechanism for lubricating a second lubricating face 47a of a thrust bearing 47. As shown in FIGS. 2 and 5, the second sliding face 47a is formed on the rear end face of the thrust bearing 47 protruded from the rear end face of the division case 15A.

Another division case 15B is bonded to the division case 15A, from the rear, via a bonding face H2 (shown below the oil pump 30 in FIG. 2) toward the rear side.

As shown in FIG. 2, a wall portion 54, extending in a flange-like form from the outer peripheral side to the inner peripheral side, is provided at the rear portion of the division case 15A. The thrust bearing 47 is formed at a position corresponding to the aforementioned thrust washer 46 on the rear face 54a of the wall portion 54. The thrust bearing 47 is provided such that it protrudes in a disc-like form to the rear from the rear face 54a of the wall portion 54, and the rear end face is smoothly finished at a right angle to the axial direction. The rear end face acts as the second sliding face 47a. The second sliding face 47a slidably supports the thrust washer 46, namely, the front end face 46a of the thrust washer 46 engaging with the dent portion 43b in the center of the front end face of the gear 43 of the drive shaft 31, to keep the entire drive shaft 31 from moving forward along the axial direction and to position the drive shaft 31.

A bearing holding portion 55 is formed inside (side closer to the axis 16) of the wall portion 54 so as to hold the bearing 56. The bearing 56 is a ball bearing 56d, which comprises an outer race 56a, an inner race 56b and a plurality of balls held by a holding device 56c disposed between the outer race 56a and the inner race 56b. The outer race 56a engages an inner peripheral face 55a of the bearing holding portion 55 and the inner race 56b engages with an outer face 57a of the linkage member 57. The linkage member 57 is a member for coupling the sun gear S0 with the rotor 21 (see FIG. 1) of the first electric motor 11. The entire bearing 56 is held by the bearing holding portion 55 of the division case 15A such that the sun gear S0 and the rotor 21 are rotatably supported with respect to the input shaft 17 through the linkage member 57.

Lubricant is supplied to the bearing 56 from the side of the input shaft 17. That is, as shown in FIG. 2, an oil passage a is formed between the inner peripheral face of the linkage member 57 and the outer face of the input shaft 17, and an oil passage b is formed in the axial direction between the inner peripheral face of the linkage member 57 and the outer face of a boss portion 58 of the sun gear S0. The oil passage b is closed, at the rear end side, with a sealing member 60 held by a ring 59. Further, an oil passage c is formed in the linkage member 57 radially such that it communicates with the oil passage b and passes through the linkage member 57 from the inner peripheral side to the outer peripheral side. The position of the oil passage c, in the axial direction, is slightly rearward of the rear face of the bearing 56 and substantially coincides with the position of the second sliding face 47a, in the axial direction, of the thrust bearing 47. That is, the oil passage c relatively overlaps the thrust bearing 47 in the axial direction.

An oil sump 61 for collecting lubricant which is to be discharged from the oil passage c is formed on the bearing holding portion 55. The oil sump 61 is formed in a ring-like form such that it covers the outer peripheral side of the rear face of the bearing 56. The inner peripheral face of the oil sump 61 is formed with an inclined face 61a whose diameter increases from the rear side to the front side, namely, in the inclined face 61a, the side of the bearing 56 is in a larger diameter. The position of the inclined face 61a in the axial direction substantially coincides with the aforementioned oil passage c. That is, the oil passage c is disposed within the region of the inclined face 61a in the axial direction. Consequently, lubricant supplied to the outside from the oil passage c is collected by the inclined face 61a and introduced to a rolling face of a ball 56d in the outer race 56a and inner race 56b of the bearing 56.

According to the embodiment, by cutting out part along the circumferential direction of the ring-like oil sump 61, as shown in FIGS. 2 and 5, a cutout portion 61*b* which communicates with the outside from the inside inclined face 61*a* is formed. The position of the cutout portion 61*b* in the axial direction coincides with the position of the oil passage c in the axial direction and the position of the thrust bearing in the axial direction. On the other hand, as shown in FIG. 5, the position of the cutout portion 61*b* along the circumference of the oil sump 61 is located slightly upstream of a pedestal with respect to the second sliding face 47*a* along the rotation direction (direction of an arrow R) of the aforementioned carrier CR. That is, an extension of a center line 61*c* of the cutout portion 61*b* along the circumference of the oil sump 61 passes upstream of, at least, the center of the second sliding face 47*a*. Further, the extension of the center line 61*c* may pass further upstream side of a portion situated on the most upstream side of the second sliding face 47*a*.

According to the embodiment, a wall-like first rib 62 is provided for introducing lubricant, that is supplied outward from the cutout portion 61*b*, to the second sliding face 47*a*. A base end portion 62*a* of the first rib 62 is connected to the slightly downstream side of the cutout portion 61*b* along the outer face of the oil sump 61, and a tip end portion 62*b* of the first rib 62 is connected to the slightly upstream side of the center of the second sliding face 47*a*. Thus, lubricant supplied from the cutout portion 61*b* can be supplied efficiently to the second sliding face 47*a* along the first rib 62.

Further, a wall-like second rib 64 is extended from the inner peripheral face of an outer peripheral wall 63 (wall having the bonding face H2) of the division case 15A up to the second sliding face 47*a*. A base end portion 64*a* of the second rib 64 is connected to a portion on the upstream side of the second sliding face 47*a* on the outer peripheral wall 63, and a tip end portion of the second rib 64 is connected to the slightly upstream side of the center of the second sliding face 47*a*. The second rib 64 also acts as a reinforcement rib of the division case 15A. Because the second rib 64 also acts as a reinforcement rib, it is not necessary to provide the second rib 64 separately from a reinforcement rib. The height dimensions (positions in the right and left direction of FIG. 2) of the first and second ribs 62, 64 are set to substantially the same level as that of the second sliding face 47*a*.

Further, the first and second ribs 62, 64 are formed substantially linearly when viewed from the direction indicated in FIG. 5, and the respective tip end portions 62*b*, 64*b*, that is, linkage portions with the second sliding face 47*a* are located at the lowest positions of the first and second ribs 62, 64. In other words, the first, second ribs 62, 64 are connected to the second sliding face 47*a* at the respective lowermost positions thereof.

According to the lubricating mechanism of the oil pump according to the embodiment having the aforementioned structure, lubricant supplied from the input shaft 17 flows in the directions of arrows K4, K5 along the oil passages a, b, c, and is supplied to the oil sump 61 in the bearing holding portion 55 of the division case 15A. Lubricant supplied to the oil sump 61 is supplied to the bearing 56 along the inclined face 61*a*. At this time, part of lubricant supplied to the oil sump 61 passes through the cutout portion 61*b* to be supplied outside of the oil sump 61, and flows in the direction of an arrow K6 along the first rib 62 to be supplied to the second sliding face 47*a*. Thus, because the second sliding face 47*a* is included in a region occupied by the cutout portion 61*b* along the axial direction of the input shaft 17, that is, as for the position of the input shaft 17 in the axial direction, the second sliding face 47*a* is set at a position overlapping the cutout portion 61*b*, lubricant supplied from the cutout portion 61*b* is likely to be distributed to the second sliding face 47*a*.

On the other hand, lubricant scattered within the division case 15A by the rotation of the rotating members, such as the aforementioned carrier CR0, is introduced by the first rib 62 to be supplied to the second sliding face 47*a*, and is further introduced in the direction of an arrow K7 by the second rib 64 to be supplied to the second sliding face 47*a*. In this case, because the second sliding face 47*a* is connected to the lowermost portions of the first and second ribs 62, 64, lubricant is likely to be collected on the second sliding face 47*a*.

As described above, according to the embodiment, part of the lubricant supplied to the oil sump 61 from the side of the input shaft 17 through the oil passages a, b, c is introduced to the first rib 62 and supplied to the second sliding face 47*a*, thereby securing a sufficient amount of lubricant. Further, because the scattered lubricant can be introduced to the second sliding face 47*a* by the second rib 64, the amount of lubricant can be increased further. That is, scattered oil can also be supplied efficiently to the second sliding face 47*a* along the second rib 64. Therefore, because the second sliding face 47*a* is connected to the lowest portions of the first and second ribs 62, 64, lubricant is introduced by the ribs 62, 64, thereby being likely to be collected on the second sliding face 47*a*.

In addition, the position of the cutout portion 61 in the axial direction is at substantially the same position as the first sliding face 47*a*, and the position of the cutout portion 61*b* along the circumferential direction is slightly on the upstream side with respect to the first sliding face 47*a*. Therefore, lubricant supplied from the cutout portion 61*b* flows in the direction of the arrow K6 in FIG. 5, and is collected on the second sliding face efficiently. Thus, even if the drive shaft 31 of the oil pump 30 rotates at a higher speed compared to a regular case, a sufficient amount of lubricant can be supplied to the second sliding face 47*a* on which the thrust washer rubs.

The embodiment describes an example in which the second sliding face 47*a* rotatably supports the front end face 46*a* of the thrust washer 46 which engages with the drive shaft 31 to constitute part of the drive shaft 31. However, instead of this, the second sliding face 47*a* may directly support rotatably the other end face (an end face on the opposite side of one end face to which the rotor 33 is fixed) in the axial direction of the drive shaft 31.

What is claimed is:

1. A lubricating mechanism of an oil pump, comprising:
a drive shaft disposed in parallel to an input shaft;
a first bearing for rotatably supporting the drive shaft;
a rotor which is fixed on one side in an axial direction of the drive shaft for pressurizing lubricant in a suction side oil chamber and feeding the lubricant to a discharge side oil chamber; and
a thrust bearing having a sliding face for rotatably supporting the other side in the axial direction of the drive shaft, a rotation of the input shaft being accelerated and transmitted to the drive shaft, wherein:
a bearing holding portion is provided for supporting a second bearing, from outside thereof, disposed inward of the sliding face along a radial direction of the input shaft;
an oil sump is provided in the bearing holding portion so as to protrude in the axial direction from an end portion of the second bearing so that lubricant supplied from the input shaft side is introduced to the second bearing; and a cutout portion is provided in the oil sump such that part of the lubricant supplied from the oil sump to the second bearing is supplied to the sliding face through the cutout portion.

2. A lubricating mechanism of an oil pump according to claim 1, wherein a lubricant hole is provided for communicating the discharge side oil chamber to the sliding face.

3. The lubricating mechanism of an oil pump according to claim 2, wherein the lubricant hole is provided in a case member in which at least part of the discharge side oil chamber is integrated with the first bearing.

4. The lubricating mechanism of an oil pump according to claim 2, wherein the lubricant hole has an intake side opening which is open, to an end portion along an axial direction of the drive shaft, in the discharge side oil chamber.

5. The lubricating mechanism of an oil pump according to claim 2, wherein the lubricant hole has an outlet side opening which is open to a substantially center along the axial direction of the drive shaft on the sliding face.

6. The lubricating mechanism of an oil pump according to claim 2, wherein a gear for accelerating a rotation of the drive shaft is disposed between the input shaft and the drive shaft.

7. A hybrid drive unit provided with the lubricating mechanism of oil pump according to claim 2, wherein the input shaft is connected to a first gear element and a first electric motor is connected to a second gear element, the hybrid drive unit comprising:

a planetary gear in which an output shaft is connected to a third gear element; and a second electric motor for transmitting drive power to the output shaft through a transmission.

8. The hybrid drive unit according to claim 7, wherein the drive power input from an engine to the input shaft is distributed to the first electric motor and the output shaft through the planetary gear.

9. The lubricating mechanism of an oil pump according to claim 1, wherein the sliding face is included in a region occupied by the cutout portion along the axial direction of the input shaft.

10. The lubricating mechanism of an oil pump according to claim 1, wherein the drive shaft has, on the other side in the axial direction, a thrust washer which is rubbed by the sliding face.

11. The lubricating mechanism of an oil pump according to claim 10, further comprising first and second ribs connected to the sliding face at respective lowermost portions thereof.

12. The lubricating mechanism of an oil pump according to claim 1, further comprising a first rib for introducing lubricant supplied through the cutout portion from the cutout portion to the sliding face.

13. The lubricating mechanism of an oil pump according to claim 12, further comprising a second rib for introducing scattered lubricant toward the sliding face from an outer peripheral side to an inner peripheral side.

14. The lubricating mechanism of an oil pump according to claim 13, wherein the first and second ribs are connected to the sliding face at respective lowermost portions thereof.

15. The lubricating mechanism of an oil pump according to claim 13, wherein the second rib also acts as a reinforcement rib.

16. The lubricating mechanism of an oil pump according to claim 1, wherein a gear for accelerating a rotation of the drive shaft is disposed between the input shaft and the drive shaft.

17. A hybrid drive unit provided with the lubricating mechanism of an oil pump according to claim 1, wherein the input shaft is connected to a first gear element and a first electric motor is connected to a second gear element, the hybrid drive unit comprising:

a planetary gear in which an output shaft is connected to a third gear element; and a second electric motor for transmitting drive power to the output shaft through a transmission.

18. The hybrid drive unit according to claim 17, wherein the drive power input from an engine to the input shaft is distributed to the first electric motor and the output shaft through the planetary gear.

* * * * *